United States Patent
Eerola

(10) Patent No.: US 6,678,518 B2
(45) Date of Patent: Jan. 13, 2004

(54) DYNAMIC CONTENT FILTER IN A GATEWAY

(75) Inventor: Severi Eerola, Pirkkala (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/458,125

(22) Filed: Dec. 9, 1999

(65) Prior Publication Data

US 2003/0203732 A1 Oct. 30, 2003

(51) Int. Cl.[7] .................................................. H04Q 7/20
(52) U.S. Cl. ..................... 455/422.1; 455/426; 455/466; 455/552; 455/553; 707/3; 707/10; 709/227
(58) Field of Search ................................ 455/422, 426, 455/466, 552, 553; 707/13, 15; 709/227

(56) References Cited

U.S. PATENT DOCUMENTS

| | | | |
|---|---|---|---|
| 5,928,323 A | 7/1999 | Gosling et al. | 709/203 |
| 5,987,454 A | 11/1999 | Hobbs | 707/4 |
| 6,094,684 A * | 7/2000 | Pallmann | 709/227 |
| 6,332,157 B1 * | 12/2001 | Mighdoll et al. | 707/10 |
| 6,334,126 B1 * | 12/2001 | Nagatomo et al. | 707/1 |
| 6,430,409 B1 * | 8/2002 | Rossmann | 455/422 |
| 6,523,022 B1 * | 2/2003 | Hobbs | 707/3 |

* cited by examiner

Primary Examiner—Sinh Tran
Assistant Examiner—Nguyen David
(74) Attorney, Agent, or Firm—Cohen, Pontani, Lieberman & Pavane

(57) ABSTRACT

An apparatus and a method for dynamically converting data between a mobile station in a wireless communication network and an origin server in a wide area network. The method includes sending from the mobile station to a gateway server a request for resource located on an origin server in a wide area network. One or more servlets are initiated in the gateway server. The request is processed and information is dynamically generated related to the request by the one or more servlets. The processed request is sent by the one or more servlets to the origin server. The requested resource received from the origin server is then processed by the one or more servlets, which then generate a response including information indicating content type of the requested resource. The requested resource is thereafter converted from the indicated content type to another content type prior to transmission to the mobile station.

19 Claims, 1 Drawing Sheet

DYNAMIC CONTENT FILTER IN A GATEWAY

BACKGROUND OF THE INVENTION

1. Field of the Invention

The present invention relates to the wireless application protocol (WAP) environment and, more particularly, to an apparatus and a method of communicating messages and information between a server in a wide area network and a mobile station in a wireless communication network.

2. Description of the Related Art

Remote communication with individuals has become increasingly important in a mobile society. Early versions of wireless devices transmitted a signal to a paging device worn by the user. Early paging devices did little more than provide a beep indicating that a message had been sent to the user. The user then called a telephone number to receive the actual message. These early paging devices were replaced with text messaging devices that include a small display that permits the transmission of a text message, such as the message sender's telephone number. While the text messaging device provided additional data to the user, the user still has to use a separate telephone to contact the message sender, or to take action in accordance with the message.

With the advent of wireless communications networks, a user can simply call any telephone number on his cellular phone from virtually anywhere, and, once connected, speak directly to another party. Some cellular "phones" are even capable of transmitting and receiving data through an air link. These "phones," more properly named as mobile stations, operate as mobile terminals and have features similar to those of desktop computer terminals, features such as the ability to access stock quotes, weather, and e-mail messages through the Internet. Typical mobile stations, however, have less powerful processors and memories than those of desktop terminals because they have severe size, weight and power consumption constraints. The amount of data and reliability of data transmission are also limited by the available frequency spectrum, i.e., the radio resources allotted to the mobile station.

To alleviate these problems, there has been implemented the Wireless Application Protocol (WAP) for handling the interface between a mobile station and a wireless network in a manner that optimizes the computing resources of the mobile station and the radio resources of the mobile network. According to WAP, the mobile station communicates messages, encoded in Wireless Markup Language, to a gateway server connected to the wireless network, which then translates the messages into a format understood by web servers in the wide area network.

However, prior art gateway servers do not efficiently and dynamically process data between the mobile stations and web servers as they often require costly hardware implementations for different content conversions, thereby limiting the number of features available to users of the mobile stations.

SUMMARY OF THE INVENTION

An object of the present invention is to provide a method and an apparatus for efficiently and dynamically processing data between a mobile station and a server in an area wide network.

An advantage of the present invention is that a gateway server may be adapted to convert new content types and use scenarios without requiring new hardware implementations. The advantage is realized by configuring servlets (written, for example, in Java™) to perform content conversions.

According to an aspect of the invention, the method uses Java™ servlets in a gateway server to process resource requests from a mobile station and requested resources from an origin server in a wide area network. The servlets are arranged in a plurality of chains such that output from one servlet is processed by a subsequent servlet in the same chain. The servlets communicate with an administrator module, for invoking appropriate servlets, in the gateway server through an application programming interface. The servlets are configured to perform content conversions so as to adapt the requested content in accordance with user preferences, to optimize the content to a user device, to perform graphics conversions, or to automatically translate from one language to another, etc.

In one embodiment, there is provided a method for dynamically converting data between a mobile station in a wireless communication network and an origin server in a wide area network. The method includes sending from the mobile station to a gateway server a request for a resource located on an origin server in a wide area network. One or more servlets initiated in the gateway server are selectively invoked. The request is processed and information is dynamically generated related to the request by the one or more servlets. The processed request is sent by the one or more servlets to the origin server. The requested resource received from the origin server is then processed by the one or more servlets, which then generate a response including information indicating content type of the requested resource. The requested resource is thereafter converted from the indicated content type to another content type prior to transmission to the mobile station.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference characters denote similar elements.

DETAILED DESCRIPTION OF THE PRESENTLY PREFERRED EMBODIMENTS

Figure 1:
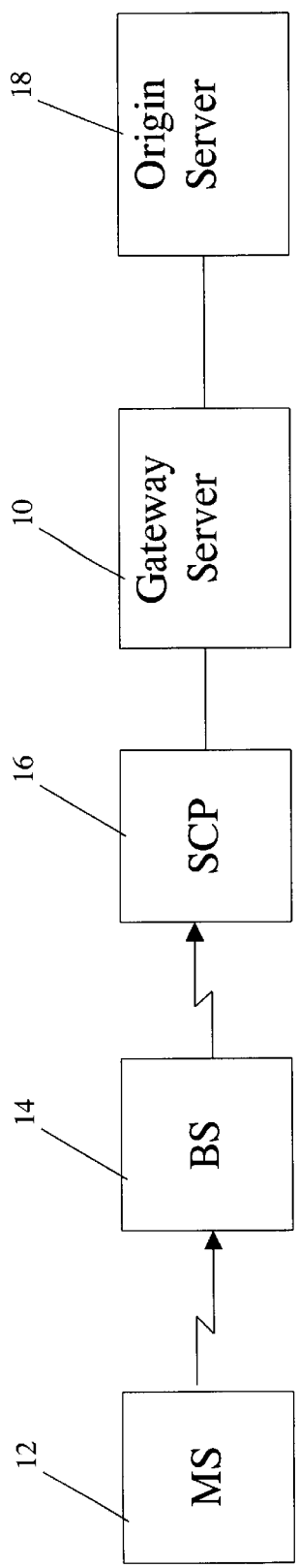
FIG. 1 is a block diagram of an embodiment of the inventive gateway server connected to a wireless communication network and a server of a wide area network.

FIG. 1 diagrammatically illustrates a gateway server 10 constructed in accordance with an embodiment of the present invention. The gateway server 10 is connected to a mobile station 12, a base station 14, and a switching control point 16. Note that the mobile station 12, the base station 14, and the switching control point 16 are connected to each other through wireless devices.

The mobile station 12 (e.g., a wireless terminal, wireless phone, palm size personal computer, etc.) preferably includes a user agent 15 (e.g., a micro-browser) configured to request and receive resources (e.g., text, application software, audio, and video data) from the origin or web server 18 in a wide area network such as, for example, the Internet or Intranet. The base station 14 allocates radio resources and relays, through wireless transmission, voice and data calls between the mobile station 12 and the switching control point 16. The switching control point 16 is configured to control, monitor, and switch voice and/or data calls between the base station 14 and other logic nodes, including the gateway server 10, of the wireless communication network.

The gateway server 10 is configured to communicate, translate, and/or process data (e.g., request messages and contents) between the mobile station 12 and one or more origin servers 18 in the wide area network. Advantageously, the gateway server 10 is configured to provide a Java™ environment that includes a set of predefined Java™ servlets (i.e. executable program modules) for dynamically processing requests and contents from the mobile station 12 and servers in the wide area network. The servlets, once initiated or instantiated, loop continuously in the server (typically, during startup of the server) and await execution instructions or invocations until the server is shut down or when the servlets are destroyed (as, for example, by terminating the operations of the servlets). This process is more efficient than that employed by the Common Gateway Interface as it avoids the overhead expense of re-initiating program modules each time the modules are executed. When invoked, the Java™ servlets dynamically generate information related to the request. The servlets need not operate independently of each other but may be linked sequentially to each other so as to form one or more servlet chains such that output of one servlet is fed to a subsequent servlet in the same servlet chain. The servlets may also be configured so that output of the last servlet of one chain is inputted to an initial servlet of another chain for further processing.

Figure 2:
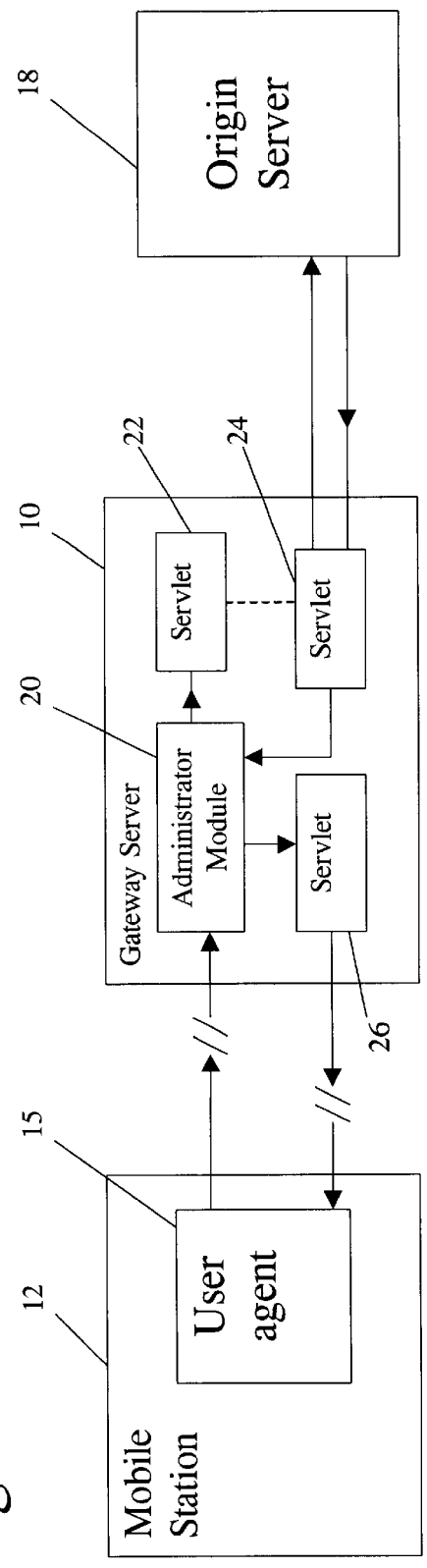
FIG. 2 schematically illustrates logic functions of a gateway server constructed in accordance with another embodiment of the present invention.

FIG. 2 illustrates one embodiment of the gateway server 10, which includes an administrator module 20, i.e. a program module for managing and invoking appropriate servlets and/or servlet chains to process Wireless Markup Language (WML) encoded requests from the mobile station 12, concurrently or sequentially, depending on the particular requests from the mobile station 12. The administrator module 20 may employ the Uniform Resource Locator (URL), a global address of documents and resources on the World Wide Web, to invoke a particular servlet. Typically, a URL has two parts: the first part specifies the protocol or scheme (e.g., HyperText Transfer Protocol (HTTP) or File Transfer Protocol (FTP)) used for fetching the resource and the second part specifies the address or location of the resource. The administrator module 20 invokes a servlet (or a servlet chain) upon receipt of a particular URL request such as, for example: http://<path>/<servlet_name?methodparameters> where "path" indicates a host name (and perhaps also a filename), and "servlet name" indicates the name of the servlet to be invoked. Such a URL request may, for example, be "http://util/loadcurve" that would cause the administrator module 20 to invoke the "loadcurve" servlet chain in the "util" host consisting of several servlets, such as, "findcurve," "createGraph," and "graphScaler." The request may also be configured as "http://util/loadcurve?type=memory" or "http://util/loadcurve/special"; in either case, the administrator module 20 will invoke the above specified servlet chain. Therefore, administrator module 20 holds a set of associations between specified URLs and servlet chains. The mapping of a URL to a servlet chain may be done by string matching of parameters between the "http://" and the "?" parts of the URL. Thus <hostname>, <path> or <servlet> is not meaningful; the entire string is.

The administrator module 20 preferably identifies a portion of the mobile station's URL request (e.g., the protocol and the server address) and invokes one or more servlets 22, 24 (which may be arranged as a servlet chain) suitable for processing that particular URL request based on the identified portion of the URL request. In other words, the administrator module 20 15 maps the mobile station's URL request to a particular one or more servlets in accordance with predetermined parameters in the mobile station's URL request. The servlets 22, 24 process the request by for example formatting the WML encoded URL request into HTTP format and fetching the requested resource (e.g., a document formatted in HyperText Markup Language (HTML)) from the specified origin or web server. Upon receipt of the requested resource, the servlets 22, 24 preferably indicate to the administrator module 20 in Multipurpose Internet Mail Extensions (MIME) format the type of content (e.g., text, image, audio, video, message, etc.) received from the origin server 18. The administrator module 20 then invokes the appropriate servlet(s) 26 (or filters), based on the indicated content type, to further process the resource or content. Advantageously, the servlets 26 are configured to perform content conversions such as translating text from one language to another language (e.g., English to Finnish, or one computer language to another), or converting graphical data from one format to another (e.g., from Graphics Interchange Format (GIF) to Joint Photographic Experts Group (JPEG) format). The converted content is then translated into the Wireless Markup Language so that it may be properly processed by the user agent 15 of the requesting mobile station.

As shown in FIG. 2, the mobile station 12, through its user agent 15, transmits a URL request through the wireless network elements (e.g., the base station 14 and the switching control point 16, which are not shown in this drawing in order to avoid unnecessary distraction from the underlying invention) to the gateway server 10. The administrator module 20 receives the request and identifies one or more servlets 22, 24 (or servlet chains) for processing the request based on the characteristics or parameters of the URL request. The identified servlets 22, 24 then execute the request and send it to the origin server 18 using HTTP or other suitable formats or protocols. The origin server 18 receiving the request fetches the requested resource and returns the requested resource back to the requesting servlet 24. The requesting servlet 24 then sends a response including a MIME header containing information indicating the content type of the requested resource to the administrator module 20. The administrator module 20 determines whether further processing by other servlets is needed. If so, appropriate servlets are invoked to convert the indicated content type to another content type, desired or required by the user. If not, the requested resource is formatted into Wireless Markup Language, using a filter or an assigned servlet, for transmission to the mobile station 12.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for dynamically converting data between a mobile station in a wireless communication network and a resource server in a wide area network (WAN), the method comprising in sequence the steps of:
   (a) sending from the mobile station to a gateway server in the wireless communication network a request for a resource located on the resource server;
   (b) identifying, by an administrative module in the ateway server, a request chain of Java servlets appropriate for processing the request based on parameters contained in the request;
   (c) selectively invoking, by the administrative module, the request Java servlet chain identified in step (b);
   (d) re-formatting, by at least one Java request conversion servlet in the request Java servlet chain, the request for transmission over the WAN to the resource server;
   (e) selectively invoking, by the at least one Java request conversion servlet, a next Java servlet in the request Java servlet chain;
   (f) sending, by at least one Java fetch servlet in the request Java servlet chain, the re-formatted request from the gateway server over the WAN to the resource server;
   (g) receiving, by the at least one Java fetch servlet, the requested resource from the resource server at the gateway server;
   (i) selectively invoking, by the at least one Java fetch servlet, at least one Java content-parsing servlet;
   (j) sending, by the at least one Java fetch servlet, the requested resource to the at least one Java content-parsing servlet;
   (k) generating, by the at least one Java content-parsing servlet, information indicating a content type of the received requested resource;
   (l) selectively invoking at least one Java content conversion servlet appropriate for the content type of the received resource; and
   (m) converting, by the at least one Java contend conversion, servlet, the content type of the received requested resource to a different content type.

2. The method of claim 1, wherein the at least one Java content conversion servlet comprises a plurality of Java servlets sequentially linked to each other as a content conversion chain of Java servlets.

3. The method of claim 1, wherein step m comprises the step of:
   translating the requested resource from one language to another language.

4. The method of claim 1, wherein step m comprises the step of:
   converting the requested resource between Graphics Interchange Format and Joint Photographic Experts Group format.

5. The method of claim 1, wherein step (l) comprises the step of:
   selectively invoking the at least one Java content conversion servlet by one of the at least one Java content-parsing servlet and the at least one Java fetch servlet, based on the information indicating content type of the received requested resource.

6. The method of claim 1, wherein the different content type in step (m) is readable by the mobile terminal, and the content type of the received requested resource is unreadable by the mobile terminal.

7. The method of claim 1, wherein the requested resource is at least one of text, application software, audio, and video.

8. The method of claim 1, further comprising the step of:
   instantiating, by the gateway server, at least one of the at least one Java request conversion servlet, the at least one Java fetch servlet, the at least one Java content-parsing servlet, and the at least one Java content conversion servlet upon startup of the gateway server.

9. The method of claim 8, further comprising the step of:
   looping continuously, by the at least one instantiated Java servlet, and awaiting invocation by at least one of the administrator module and a Java servlet.

10. A system for dynamically converting data between a mobile station in a wireless communication network and a resource server in a wide area network (WAN), the system comprising:
    a user agent running in the mobile station for sending a request for a resource located on the resource server;
    an administrator module in a gateway server for identifying and invoking a request chain of Java servlets appropriate for processing the request;
    the request chain of Java servlets comprising:
        at least one Java request conversion servlet for re-formating the request for transmission over the WAN to the resource server, and for invoking a next request Java servlet in the request Java servlet chain;
        at least one Java fetch servlet for sending the re-formatted request to the resource server, for receiving the requested resource from the resource server, and for selectively invoking at least one Java content-parsing servlet;
    said at least one Java content-parsing servlet for processing the received requested resource and for generating information indicating content type of the requested resource; and
    at least one Java content conversion servlet for converting the content type of the received requested resource to a different content type.

11. The system of claim 10, wherein the administrator module identifies the request Java servlet chain based on parameters contained in the request.

12. The system of claim 10, wherein the at least one Java content conversion servlet comprises a plurality of Java servlets sequentially linked to each other as a content conversion chain of Java servlets.

13. The system of claim 10, wherein the mobile terminal is one of a wireless terminal, a wireless phone, and a palm size personal computer.

14. The system of claim 10, wherein the request Java servlet chain, the at least one Java content-parsing servlet, and the at least one Java content conversion servlet are linked together to form a larger chain of Java servlets, wherein each servlet (except the last servlet) in the chain selectively invokes a subsequent servlet in the chain.

15. The system of claim 10, wherein a single Java fetch/content-parsing servlet performs the functions of the at least one Java fetch servlet and the at least one Java content-parsing servlet.

16. A gateway server for dynamically converting data transmitted between a mobile station in a wireless communication network and a resource server in a wide area network, the system comprising:

an administrator module for receiving a request from the mobile station for a resource located on the resource server;

a Java environment for processing and transmitting the request to the resource server, for receiving the requested resource from the resource server, and for processing and transmitting the resource to the mobile station, said Java environment comprising:

a request chain of Java servlets comprising:

at least one Java request conversion servlet for re-formatting the request for transmission over the WAN to the resource server, and for invoking a next request Java servlet in the request Java servlet chain;

at least one fetch Java servlet for sending the re-formatted request to the resource server, for receiving the requested resource from the resource server, and for selectively invoking at least one content-parsing Java servlet;

said at least one Java content-parsing servlet for processing the received requested resource and for generating information indicating content typ of the requested resource; and at least one Java content conversion Java servlet for converting tee content type of the received requested resource to a different content type.

17. The gateway server of claim 16, wherein one or more of the Java servlets are instantiated upon startup of the gateway server.

18. The gateway server of claim 16, wherein, after one or more of the Java servlets are instantiated, the one or more instantiated Java servlets loop continuously and await invocation by the administrator module.

19. The gateway server of claim 16, wherein the request Java servlet chain, the at least one Java content-parsing servlet, and the at least one Java content-conversion servlet are linked to each other to form a larger chain of Java servlets, wherein each servlet (except the last servlet) in the chain selectively invokes a subsequent servlet in the chain.

* * * * *

UNITED STATES PATENT AND TRADEMARK OFFICE
CERTIFICATE OF CORRECTION

PATENT NO. : 6,678,518 B2
DATED : January 13, 2004
INVENTOR(S) : Severi Eerola

It is certified that error appears in the above-identified patent and that said Letters Patent is hereby corrected as shown below:

Title page,
Item [57], ABSTRACT,
Line 5, insert -- a -- before "resource".
Line 13, insert -- the -- before "content".

Column 5,
Line 18, replace "ateway" with -- gateway --.
Line 36, replace "(i)" with -- (h) --.
Line 38, replace "(j)" with -- (i) --.
Line 41, replace "(k)" with -- (j) --.
Lines 44 and 64, replace "(l)" with -- (k) --.
Line 47, replace "(m)" with -- (l) --; replace "contend" with -- content --.

Column 6,
Line 5, replace "(m)" with -- (l) --
Line 31, replace "re-formating" with -- re-formatting --

Column 8,
Line 3, replace "typ" with -- type --
Line 6, replace "tee" with -- the --

Signed and Sealed this

Tenth Day of August, 2004

JON W. DUDAS
*Acting Director of the United States Patent and Trademark Office*